United States Patent [19]

Fellner et al.

[11] Patent Number: 4,513,858
[45] Date of Patent: Apr. 30, 1985

[54] HORIZONTAL ACCUMULATOR

[75] Inventors: Theodore F. Fellner; Leslie C. Talo, both of Neenah, Wis.

[73] Assignee: Mapatent, N.V., Netherlands Antilles

[21] Appl. No.: 527,838

[22] Filed: Aug. 30, 1983

Related U.S. Application Data

[62] Division of Ser. No. 264,845, May 18, 1981, Pat. No. 4,413,724.

[51] Int. Cl.$^3$ .............................................. B65G 21/14
[52] U.S. Cl. ...................................... 198/812; 198/836
[58] Field of Search ............... 198/444, 460, 594, 655, 198/678, 794, 796, 810, 812, 836, 852, 835

[56] References Cited

U.S. PATENT DOCUMENTS

| | | | |
|---|---|---|---|
| 1,168,905 | 1/1916 | Paridon | 198/655 |
| 1,381,974 | 6/1921 | Domizi | 198/678 |
| 1,492,275 | 4/1924 | Thompson | 198/599 |
| 1,831,122 | 11/1931 | King | 198/599 |
| 2,619,843 | 12/1952 | Kampfer | 198/852 |
| 2,932,376 | 4/1960 | Millington | 198/594 |
| 3,370,693 | 2/1968 | Marsden | 198/460 |
| 4,168,776 | 9/1979 | Hoeboer | 198/812 |
| 4,173,280 | 11/1979 | Dawson | 198/812 |
| 4,194,343 | 3/1980 | Myers et al. | 198/594 |
| 4,299,322 | 11/1981 | Greenhead et al. | 198/835 |

Primary Examiner—Joseph E. Valenza
Attorney, Agent, or Firm—Wigman & Cohen

[57] ABSTRACT

This invention relates to a power-driven conveyor system for transporting and accumulating a plurality of items along a path of movement from a source to a destination. The system includes a horizontally oriented section for accumulating the items along the path and an apparatus for transporting the items therealong. The apparatus may be either a plurality of parallel, spaced-apart endless belts or a plurality of conveying sections interconnected together to form an endless carrier. Each section of the carrier may constitute itself a device for directly carrying one of the items. The invention provides an effective horizontal accumulator for items on a production or an assembly line operating at a relatively high speed. The accumulator operates on the FIFO principle so that, upon a malfunction of either upstream or downstream equipment, dated or otherwise sequentially marked items are stored in such a manner that the first item into the system is the first item to come out. Additionally, the invention provides an effective horizontal accumulator for items with irregular shapes or of fragile nature. Production line backpressure does not exist so that the risk of locking or wedging of items being transported is reduced. There is also a reduced risk of breakage or quality damage. Additionally, the invention provides an effective horizontal accumulator for items requiring a particular orientation as delivered by the source. The items are maintained and delivered according to the needs at the destination.

17 Claims, 24 Drawing Figures

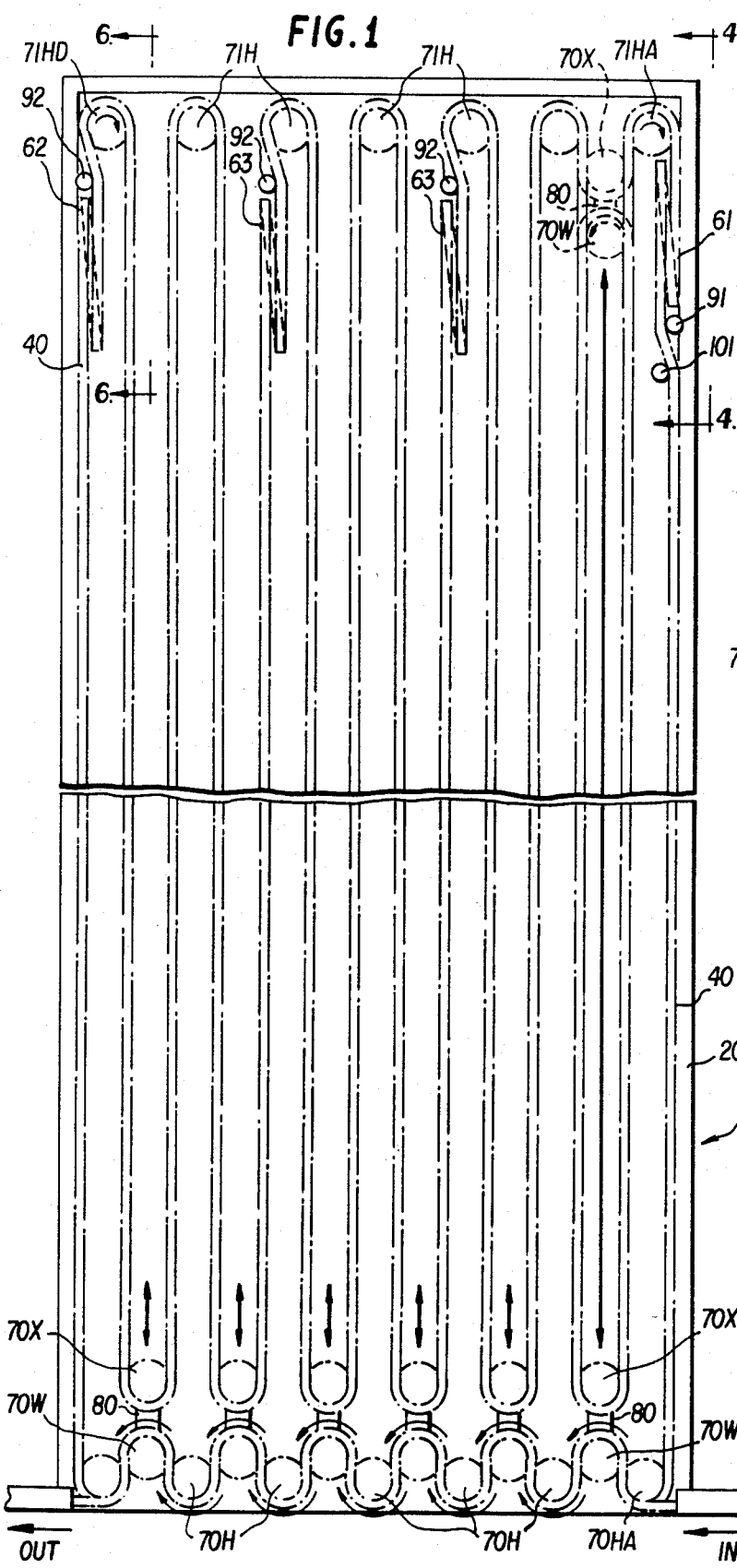

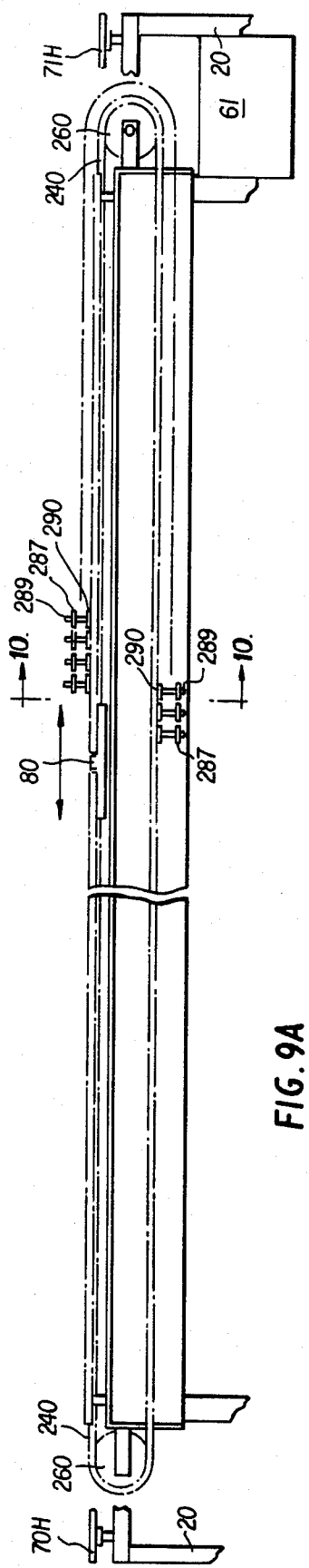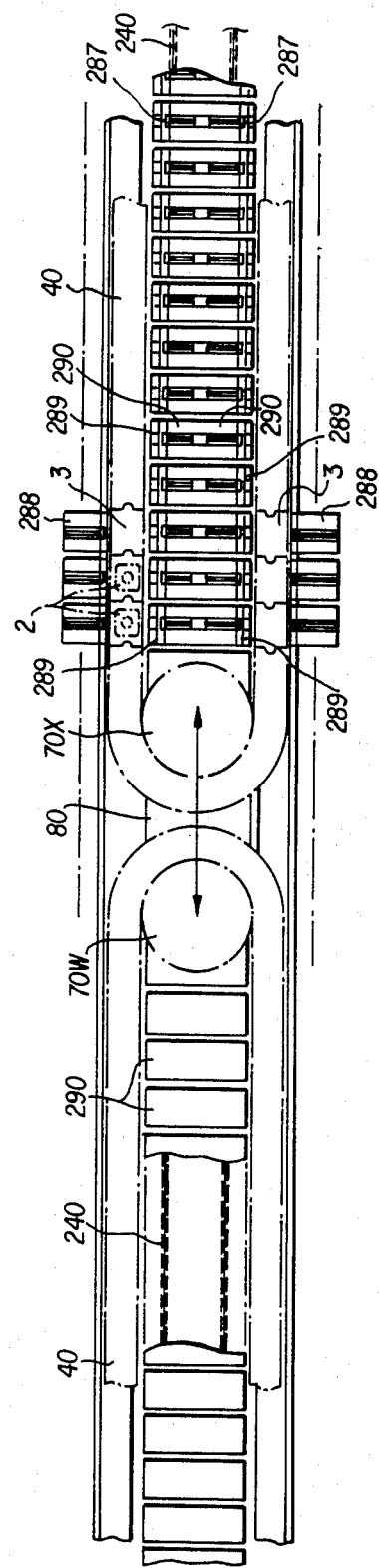
FIG. 9A
FIG. 9B

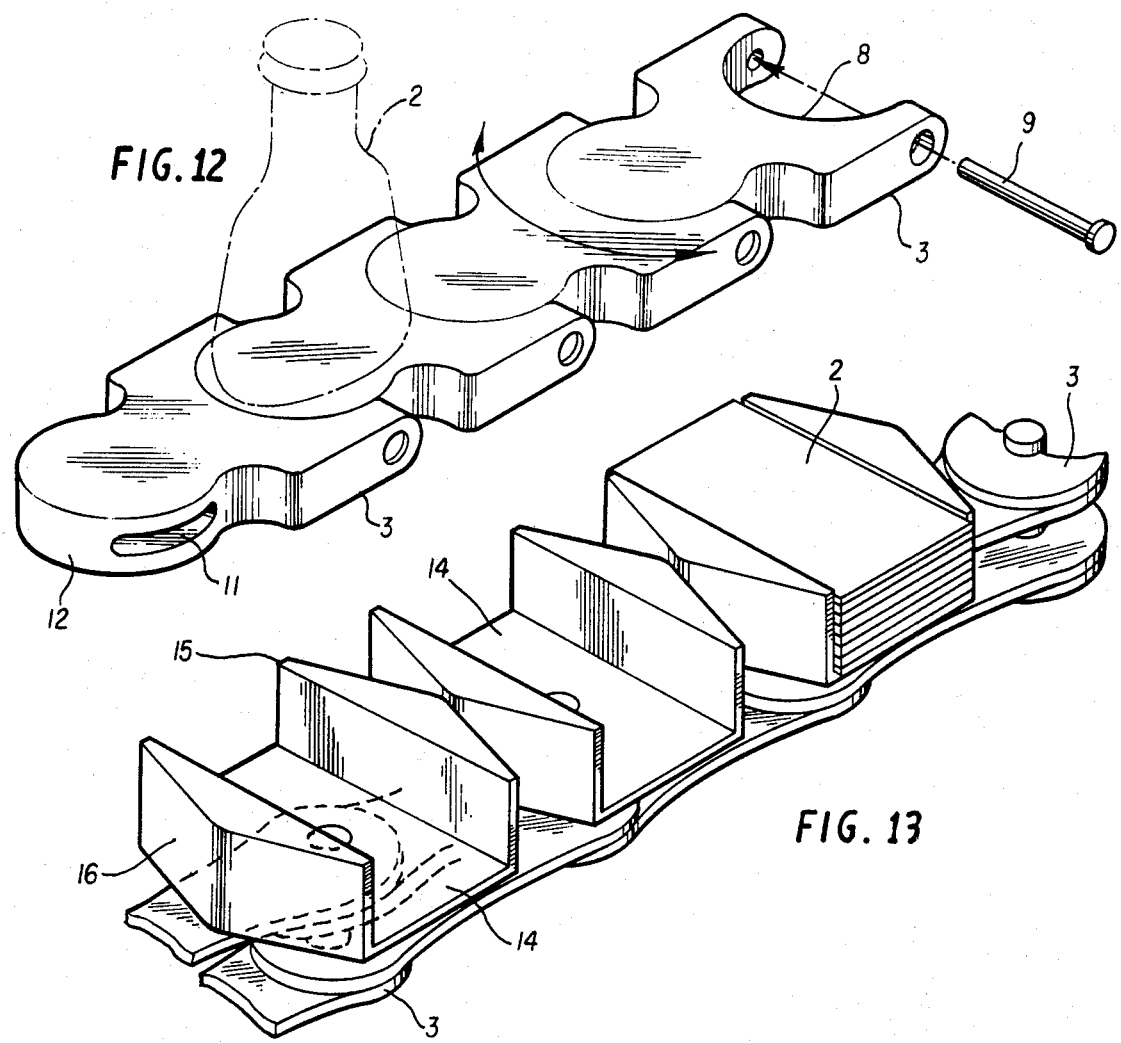
FIG. 12
FIG. 13
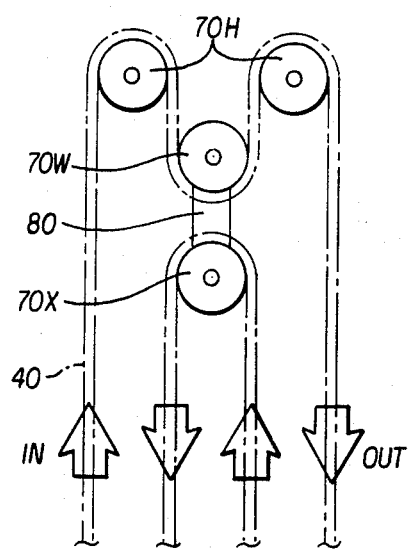
FIG. 14
BOTH INFEED AND DISCHARGE DRIVE
OPERATIONAL IN TRANSPORT MODE
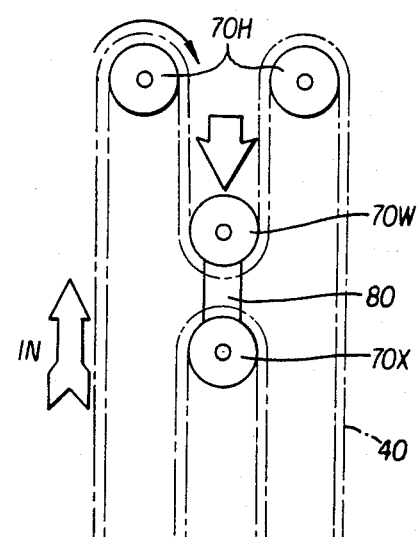
FIG. 15
ONLY INFEED DRIVE OPERATIONAL
IN ACCUMULATION MODE

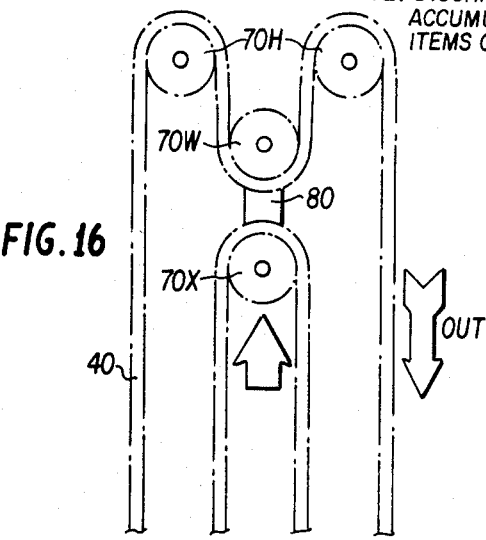
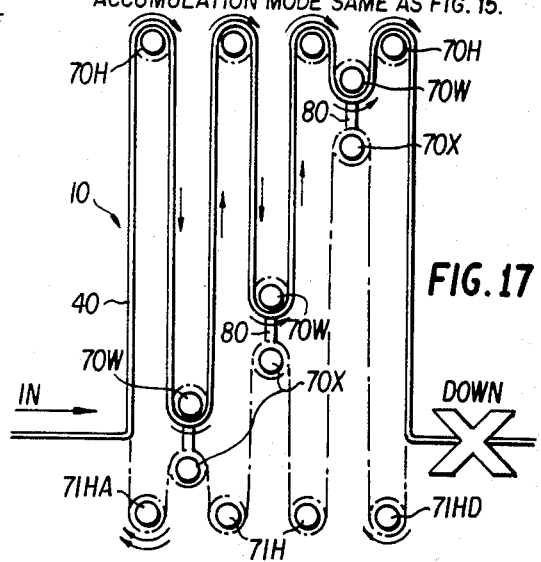
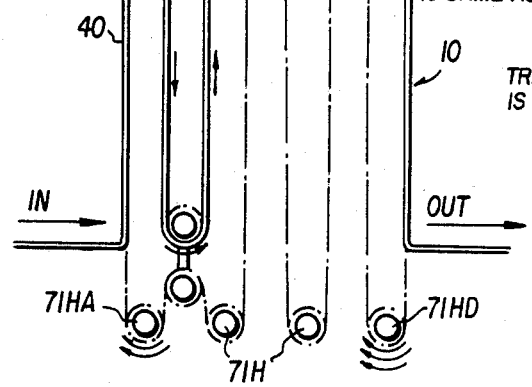
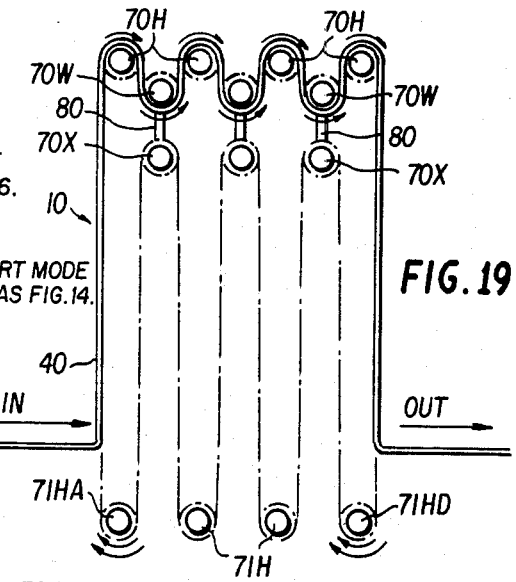
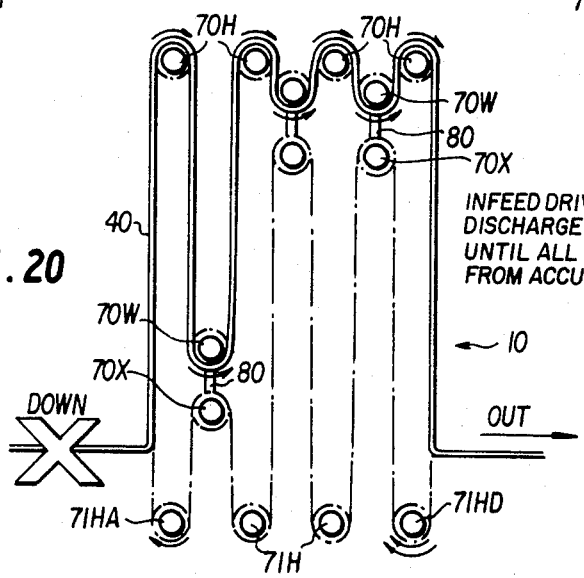

HORIZONTAL ACCUMULATOR

This is a division of application Ser. No. 264,845, filed May 18, 1981, now U.S. Pat. No. 4,413,724.

BACKGROUND OF THE INVENTION

1. Field of the Invention

This invention relates to a power-driven conveyor system having at least one horizontally oriented section for accumulating items moving between a source and a destination.

2. Description of the Prior Art

Many power-driven conveyor systems for accumulating items have sections oriented vertically because they take up less floor space and may be built quite high. However, these systems, which usually use an endless chain and a plurality of pulley wheels, must necessarily have the pulley wheels spaced quite a relative distance apart in order to make room for assemblies which are attached to the endless chain for carrying items thereon. Such exemplary prior art systems are the vertical accumulators covered by U.S. Pat. No. 4,168,776, issued to Hoeboer in 1979; U.S. Pat. No. 4,142,626, issued to Bradley in 1979; and U.S. Pat. No. 2,933,176, issued to Mansson in 1960.

Such vertical accumulators must be run relatively slow because their operation requires reliable transfer of items to be accumulated both into and out of the unit. This relatively slow operational speed is a definite disadvantage.

Another disadvantage of such vertical accumulators is that the assemblies for carrying items to be accumulated are usually a free pivoting design which increases the potential for damage or breakage of fragile items that are being transported or accumulated. Additional disadvantages of such vertical accumulators are that transfer of items into such units usually requires mechanical movement of the items to be accumulated which increases the breakage potential of fragile items. In addition, this mechanical movement of items is generally recognized as being a potential cause of lower production efficiencies because of problems historically associated with these mechanical movements. Also, the assemblies for carrying items to be accumulated do not usually accommodate irregular shapes and sizes because of their inability to reliably transfer and contain such items.

Because of the presence of such carrier assemblies, it has also been a problem to condense the arrangement of the endless chain and the plurality of pulley wheels into a volume occupying significantly less floor space.

There are horizontal accumulators known in the prior art. Exemplary systems are shown in U.S. Pat. No. 3,506,105, issued to Stauber in 1970, U.S. Pat. No. 3,448,846, issued to Bardenhagen in 1969, U.S. Pat. No. 3,370,693, issued to Marsden in 1968; and U.S. Pat. No. 2,932,376, issued to Millington in 1960. However, many prior art horizontal accumulators operate on the LIFO principle, i.e., upon a malfunction of either upstream or downstream equipment, the items are stored in the accumulator in such a manner that the last item into the system is the first item out of the system when the malfunction in the equipment is corrected and the upstream or downstream equipment is up and running again. This LIFO principle of operation is a disadvantage in systems where maintaining sequence of manufacture is important. This LIFO principle of operation also affects reliability in that accumulated items must be reintroduced into the same stream of items being delivered by the source. This reintroduction negatively affects item quality and production line efficiencies.

Horizontal accumulators do exist that operate on the FIFO principle, i.e., first in first out. However, these systems carry with them the disadvantages of breakage or damage caused by production line back pressure or less than acceptable production efficiencies in that production line back pressure results in locking or wedging of the accumulated items which in turn results in lower production line efficiencies. In addition, many horizontal accumulators that operate on the FIFO principle demand that the accumulated item be mechanically pushed from one portion of the conveying means to another portion of the conveying means. This mechanical pushing results in lower production line efficiencies when changing direction of movement from one direction to another, in that the probability of jamming or falling is increased. Many horizontal accumulators, both FIFO and LIFO, have great difficulty in maintaining the items in the same orientation as delivered by the source, e.g., labels on one side, pour spout at top, handle leading, etc. This fact negatively affects production line efficiencies.

SUMMARY OF THE INVENTION

The present invention relates to a power driven conveyor system having at least one horizontal section for accumulating items moving between a source and a destination.

It is a primary object of the present invention to provide an effective and reliable accumulator for items on a production or an assembly line operating at a relatively high speed.

It is another primary object of this invention to operate an accumulator on the FIFO principle, i.e., upon a malfunction of either upstream or downstream equipment, dated or otherwise sequentially manufactured items are stored so that the first item into the system is the first item to come out. Such dated items are most important in industries handling and packaging fresh foods, e.g., meat, cheese, poultry and candy. Dated products are also important in the canning, frozen foods and health care industries. Items marked in a particular sequence are likewise important in the paper, toiletry, automotive and electronic industries.

It is another object of the present invention to ensure the orientation of items to be accumulated is not changed, as delivered from the source and required by the destination.

It is another object of the present invention to provide the capability for reliable transfer from one direction of movement to another direction of movement of items to be accumulated, thereby enabling high operational speed with no sacrifice in production line efficiency.

It is another object of the present invention to decrease the potential for damage or breakage as well as jamming or wedging of items to be accumulated because of multiple direction transfer points or production line back pressure.

It is another object of the present invention to provide effective and reliable containmnet of irregular shaped and sized items to be accumulated.

The accomplishment of these and other objects to be discussed hereinafter will become readily apparent from the following description of various embodiments of the present invention.

BRIEF DESCRIPTION OF THE DRAWINGS

FIG. 1 is a top plan view showing an arrangement of an endless conveying means and a plurality of turning wheels in one embodiment of a horizontal accumulator;

FIG. 2 is a partial top plan view of a plurality of interconnected pulley wheels;

FIGS. 9A and 9B are side elevational and top plan views of a chain for carrying a deck of slats with a plurality of item guide rails for supporting a plurality of items to be accumulated during the accumulation cycle, on the horizontal accumulator shown in FIG. 1;

FIG. 12 is a perspective view showing tongue and groove connections forming a plurality of chain links making up an endless conveying means for carrying items to be accumulated thereon;

FIG. 13 is a perspective view showing item carriers attached to a plurality of chain link plates, or similar conveying means, making up an endless chain for carrying a plurality of stacked thin items, such as wrapped cheese slices, thereon; changes in item carrier designs will accommodate a wide range of differently sized and shaped items to be accumulated thereon;

FIGS. 14-16 are partial top plan views showing various movements of the endless conveying means around one end of a small sized modification of the embodiment shown in FIG. 1;

FIGS. 17-20 are top plan views showing various operating stages of the endless conveying means of a moderately sized version of the embodiment shown in FIG. 1;

DETAILED DESCRIPTION OF THE PREFERRED EMBODIMENTS

Figure 3:
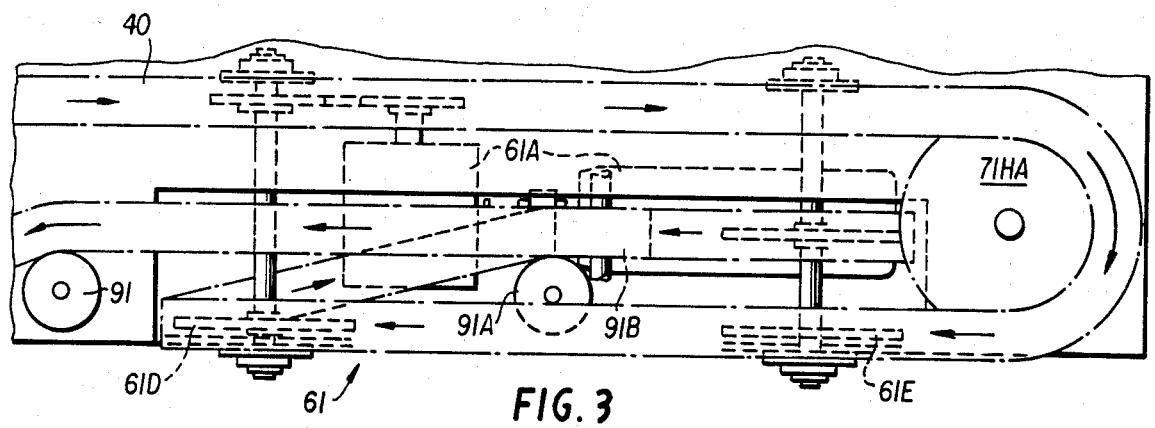
FIG. 3 is a close-up top plan view of a drive mechanism shown in FIG. 1.

FIG. 1 shows a power driven conveyor system 10 for transporting and accumulating a plurality of items 2, shown but not confined to items in FIGS. 12 and 13, along a path of movement, indicated by arrow heads, from an infeeding source IN to an outgoing destination OUT. The system 10 has a horizontally oriented accumulator section 20 for accumulating the plurality of items 2 along the path of movement.

An endless conveying means 40 transports the plurality of items 2 along the path. A plurality of chain links 3, shown in FIGS. 12 and 13, are interconnected to form this version of endless conveying means 40 which is driven by an infeed drive mechanism 61, shown in detail in FIGS. 3 and 4.

For the sake of clarity hereinafter, it should be pointed out that the designation H refers to pulley wheels on the horizontal section 20; designation A refers to the infeeding or accumulating side of system 10; and designation D refers to the exit or discharging side of system 10.

A plurality of fixed pulley wheels 70H are arranged at one end of the section 20. A plurality of interconnected pairs of pulley wheels 70W and 70X are shown adjacent to the plurality of fixed pulley wheels 70H. The fixed pulley wheels 70H and the pulley wheels 70W guide the endless conveying means 40 along the serpentine path of movement indicated by the darkened arrow heads. The pulley wheels 70W and 70X are interconnected in pairs by slide assemblies 80, shown in detail in FIG. 7. The assemblies 80 stretch out or otherwise extend the length of the path of movement of items 2 around pulley wheels 70H and 70W, alternately, in a manner to be described in detail hereinafter in regard to FIGS. 14-23.

Another plurality of fixed pulley wheels 71H is arranged at the other end of section 20. The assemblies 80 may slide from the position adjacent to the fixed pulley wheels 70H to a maximum distance at a position adjacent to the fixed pulley wheels 71H when accumulating items 2 on the endless conveying means 40. The extreme position of one slide assembly 80 adjacent to the wheels 71H is shown in phantom lines in FIG. 1.

As shown in FIG. 2, a plurality of slide assemblies 80 may be interconnected by one or more cross braces 88 so that all assemblies 80 slide together away from the position adjacent to pulley wheels 70H.

Figure 4:
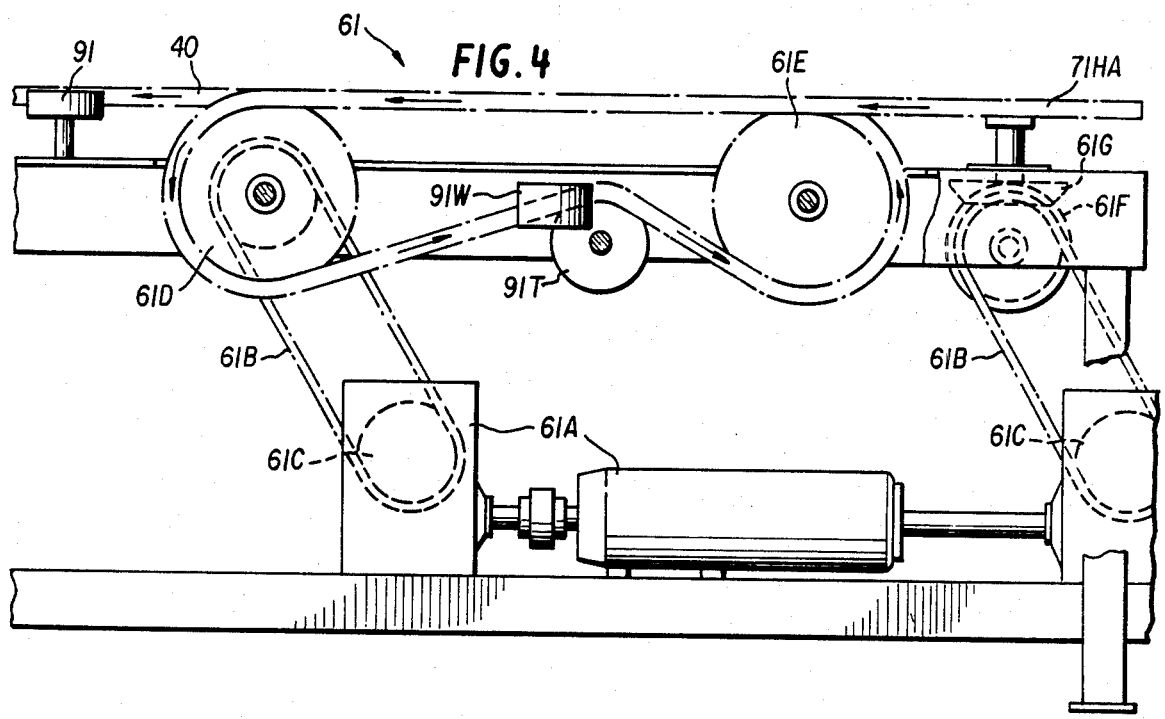
FIG. 4 is a close-up side elevational view of the drive mechanism shown along line 4—4 in FIG. 1.

An infeed drive mechanism 61, shown in detail in FIGS. 3 and 4, controls the accumulation of incoming items 2 on endless conveying means 40. The discharge drive mechanism 62, shown in detail in FIGS. 5 and 6, controls the discharge of outgoing items 2 from endless conveying means 40. These two drive mechanisms 61 and 62 work in conjunction with each other. Their key components are driving motors 61A and 62A, respectively.

Now viewing FIGS. 3 and 4 in particular with FIG. 1, it may be seen that endless conveying means 40 enters the area of the infeed drive mechanism 61 by moving horizontally, as shown in the top plan view of FIG. 3. Conveying means 40 goes around a first fixed pulley wheel 71HA so that its direction of travel is reversed and it moves to the left. Conveying means 40 then goes down around and under a second fixed pulley wheel 61D, best shown in FIG. 4. Wheel 61D is driven directly by belt 61B which is, in turn, driven by small pulley wheel 61C attached directly to the motor 61A. Conveying means 40 then moves up a slight incline to the right and is deflected sideways by a guiding means including an idling wheel 91W over tensioning roll 91T. Conveying means 40 moves down a slight decline, then under and around a third pulley wheel 61E. The direction of travel of conveying means 40 is once again reversed as it moves over the top of pulley wheel 61E to the left. The conveying means 40 moves sideways around post 91, which is shown in FIGS. 1, 3 and 4, and then it is deflected into a straight horizontal path as it moves around post 101, shown only in FIG. 1. Conveying means 40 now moves toward the infeeding source IN where items 2 are fed thereon near, but limited to, the first fixed pulley wheel 70HA, as best shown in FIG. 1.

In FIG. 1, there is one main discharge drive mechanism 62 on the exit side of section 20 and a plurality of helper drive mechanisms 63 which are substantially identical to the main discharge drive mechanism 62. The number of helper drive mechanisms 63 will depend upon the length of the endless conveying means 40 and the combined weight of the plurality of items 2 carried thereon. In the embodiment shown in FIG. 1, there are two such helper drive mechanisms 63.

Figure 5:
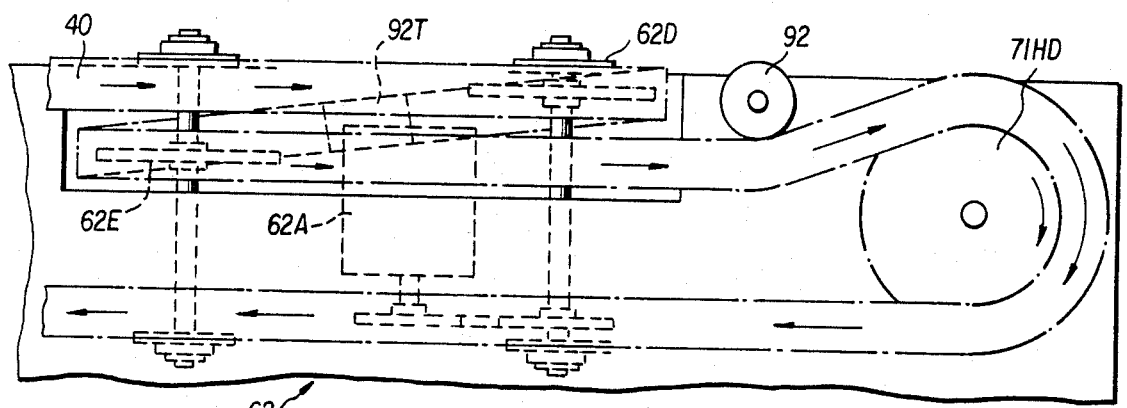
FIG. 5 is a close-up top plan view of a discharge or helper drive shown in FIG. 1.
Figure 6:
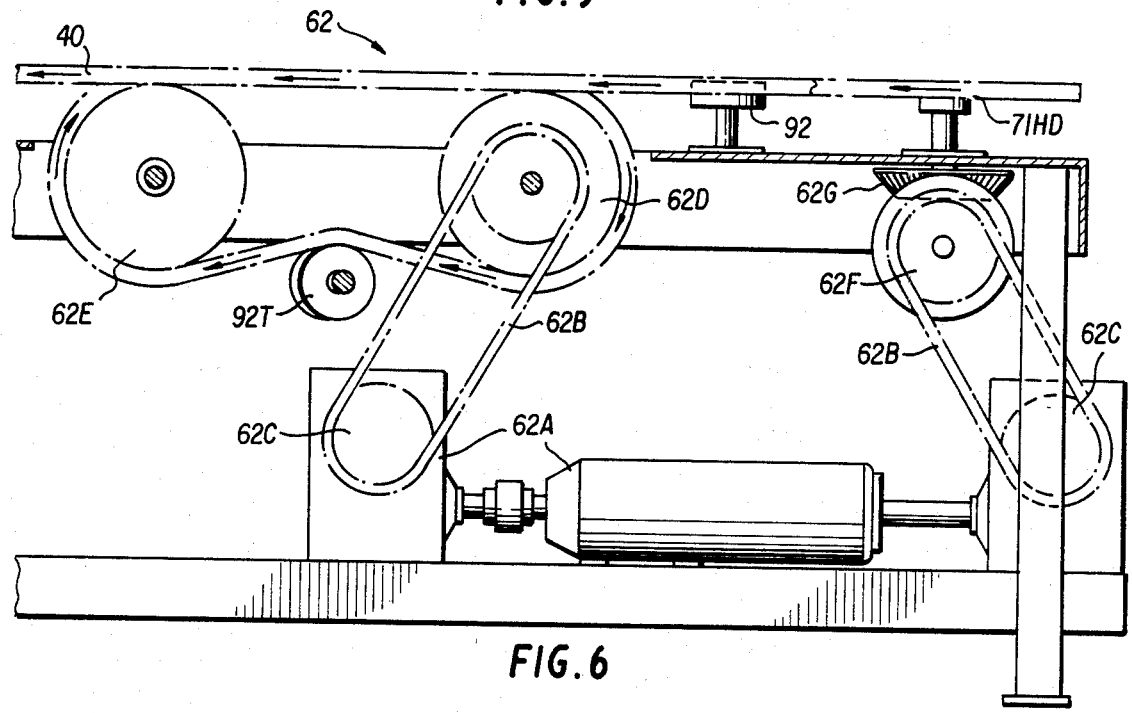
FIG. 6 is a close-up side elevational view of the discharge or helper drive shown along line 6—6 in FIG. 1.

Now viewing FIGS. 5 and 6, in particular, with FIG. 1, it may be seen that endless conveying means 40 leaves the outgoing destination OUT and enters the area of the discharge drive mechanism 62 by moving horizontally, as best shown in the top plan view of FIG. 5. After going around the fixed pulley wheel 70H, conveying means 40 goes down and around under a second fixed pulley wheel 62D so that its direction of travel is reversed as it moves laterally to the left. Wheel 62D is driven directly by belt 62B which is, in turn, driven by small pulley wheel 62C attached directly to the motor 62A. Conveying means 40 moves over tensioning roll 92T, then around a third pulley wheel 62E so that the direction of travel of conveying means 40 is again reversed to the right. Post 92 deflects conveying means 40 sideways so that it goes around fixed pulley wheel 71HD, once more reversing the direction of travel of conveying means 40, which now travels toward pulley wheel 70X on slide assembly 80 at the opposite end of section 20, best shown in FIG. 1.

The periodic reversing of direction and looping of the conveying means 40 around the various pulley wheels is necessary in order to prevent slack in the conveying means 40, particularly if it is very long, and to ensure that the required drive power is transmitted effectively.

Figure 7:
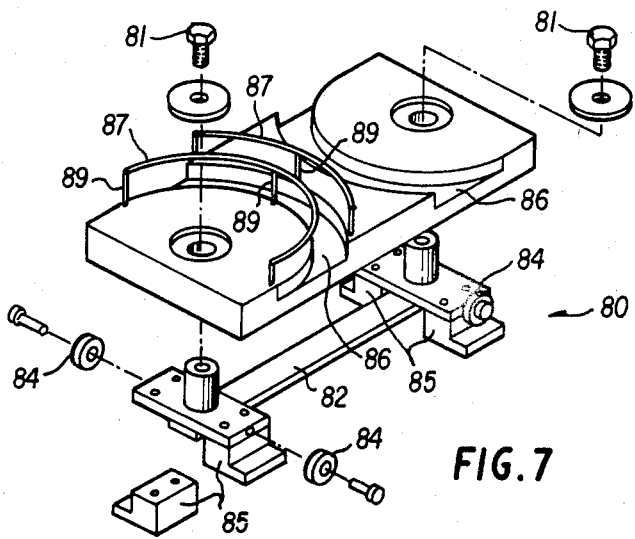
FIG. 7 is an exploded view showing the details of a slide assembly used for moving a pair of interconnected pulley wheels along the accumulator shown in FIG. 1.

FIG. 7 shows an exploded view of the details of the slide assembly 80 which interconnects a pair of pulley wheels, such as wheels 70W and 70X shown, for example, in FIG. 1 on section 20. For example, wheels 70W and 70X are interconnected by bolts 81, shown in FIG. 7, through their centers at opposite ends of a bar 82 and a frame. For schematic purposes, only bar 82 is shown as a representation of slide assembly 80 in the embodiments of FIGS. 1, 2 and 14-23. Section 20 has suspended tracks (not shown) running parallel to and underneath the endless chain 40. Slide assembly 80 has roller wheels 84 which roll on the tracks and guide blocks 85 which slide along underneath the tracks. The endless conveying means 40 travels in grooves 86 as it moves around the wheels 70W and 70X. The plurality of items 2 are prevented from falling off the moving endless conveying means 40 as it moves around wheels 70W and 70X by guide rails 87 attached to the frame by posts 89.

Figure 8:
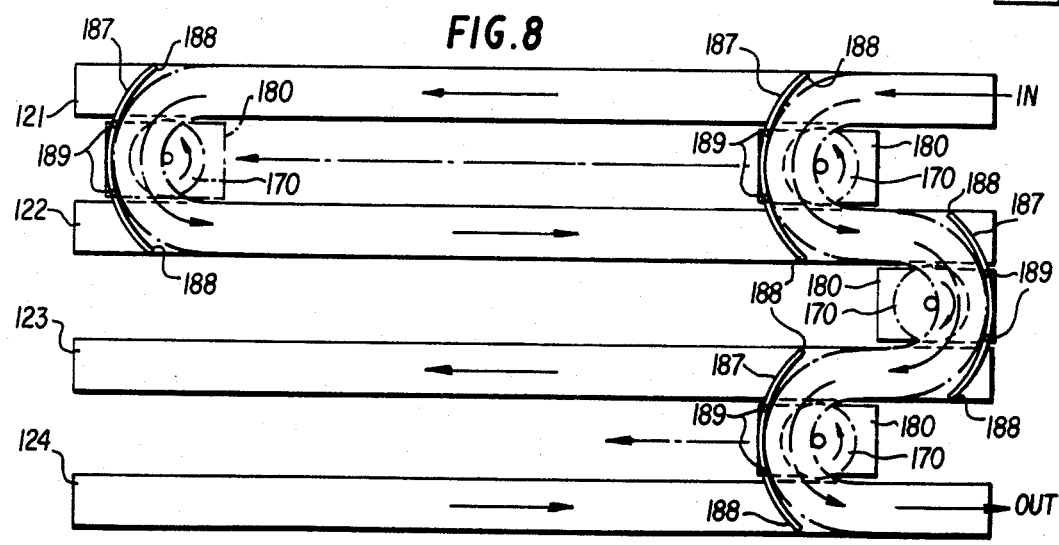
FIG. 8 is a top plan view showing an arrangement of endless conveyor belts and a plurality of slide assemblies in a second embodiment of a horizontal accumulator.

A second embodiment of the horizontal accumulator of the present invention is illustrated in FIG. 8. Instead of the single horizontally oriented section 20, the endless conveying means 40, the plurality of fixed pulley wheels 70H-71H, and the plurality of interconnected pairs of pulley wheels 70W-70X on the slide assembly 80 shown in FIG. 1, this second embodiment has a plurality of horizontally oriented parallel conveyor belts 121-124 driven in opposite directions, no endless chain, no fixed pulley wheels, and a plurality of single pulley wheels 170 mounted on a plurality of slide assemblies 180. Guide rails 187 divert the direction of travel of items to be accumulated, from traveling to the left on conveyor 121 onto slide assembly 180 which, by rotating pulley wheel 170 and by the force of the items 2 therebehind, redirect each item 2 onto conveyor 122 traveling to the right. Posts 189 secure each guide rail 187 to each slide assembly 180. Each guide rail 187 has free ends 188 which extend across and above but do not contact each conveyor 121-124. The free ends 188 are curvilinear and act as catchers for diverting the flow of the items 2 from one conveyor belt traveling in one direction to the next parallel belt traveling in the opposite direction.

Figure 10:
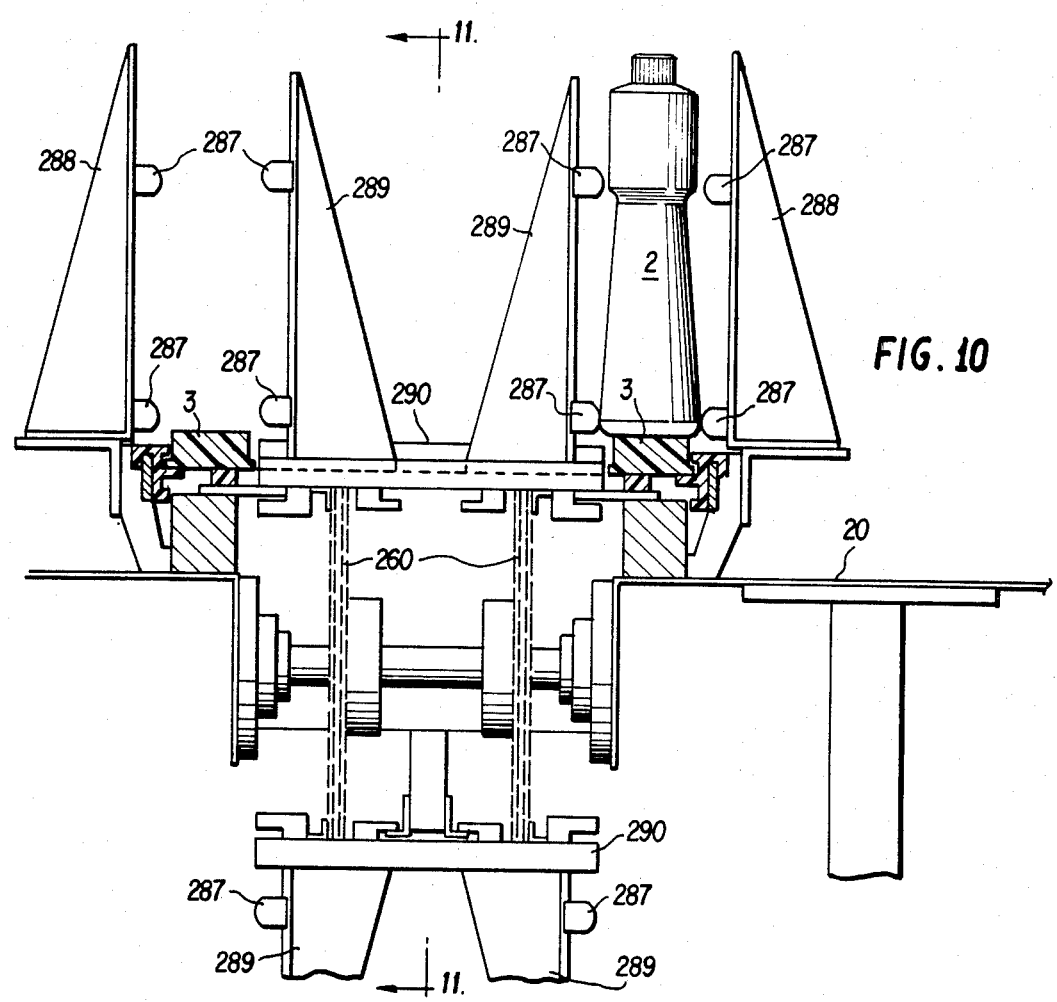
FIG. 10 is a close-up view of the chain and item guide rails shown along line 10—10 in FIG. 9A.
Figure 11:
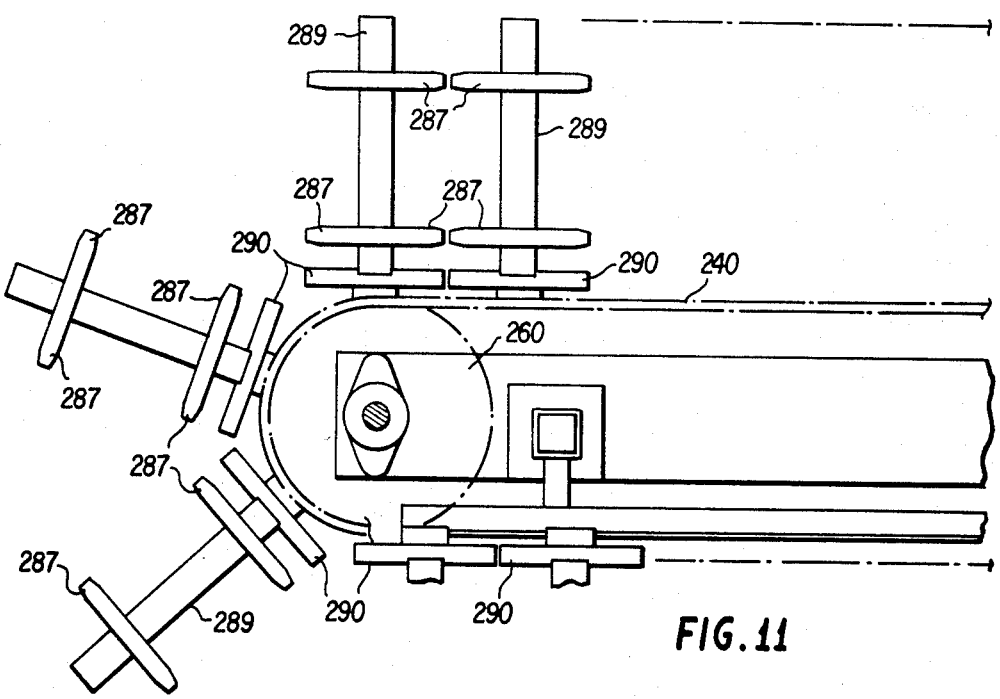
FIG. 11 is a close-up side elevational view taken along line 11—11 of the chain and item guide rails shown in FIG. 10.

FIGS. 9-11 show a modified version of the first embodiment of the horizontal accumulator shown in FIG. 1. This modified version is particularly adapted for accumulating tall items, such as but not limited to, bottles 2, shown in FIG. 10, and may also be used with the three embodiments shown in FIGS. 14-22 to be described hereinafter.

In FIG. 9A, the slide assembly 80 is shown in an intermediate position between fixed pulley wheel 70H at one end of horizontal section 20 and fixed pulley wheel 71H at the other end of section 20. In FIGS. 9B and 10, a plurality of upstanding guide posts 288 are fixed along the outer side of the path of movement for the plurality of items 2. In FIGS. 9B, 10 and 11, there is shown a plurality of substantially identical upstanding guide posts 289 which travel with the plurality of items 2 along the inner side of the path of movement of items 2.

As best shown in FIGS. 10 and 11, each of the plurality of outer and inner guide posts 288 and 289 carry guide rails 287 for preventing the tall items 2 from falling off the chain links 3 upon which each of the items 2 travel. Each pair of the plurality of inner guide posts 289 is secured to one of a plurality of slats 290 which are interconnected to each other in order to form a deck and are carried by an endless chain 240, best shown in FIG. 11, which goes around two large sprocket wheels 260. By viewing FIG. 9A, it may be seen that the two sprocket wheels 260 are positioned near to the opposite ends of the horizontal section 20. There are a plurality of spaced-apart, parallel endless chains 240, each of which carries one side of a separate deck of slats 290, independently of but interlockingly connected with the endless chain 240 to each slide assembly 80.

As may be seen from FIGS. 9A and 9B, when slide assembly 80 moves all the way next to fixed pulley wheel 71H at one end of horizontal section 20, the right half of the deck of slats 290 with guide posts 289 is pulled all the way up and around onto the top side of section 20 so that guide posts 289 fill substantially completely the space between endless conveying means 40 from one end near pulley wheel 70H to the other end near pulley wheel 71H on section 20. At the same time, the left half of the deck of slats 290, shown without the guide posts 289 in FIG. 9B, is retracted onto the underside of section 20. However, as slide assembly 80 moves away from fixed pulley wheel 71H toward the pulley wheel 70H at the other end of section 20 in order to accumulate items 2 on the extended conveying means 40, the movement of endless chain 240 is synchronized by conventional electrical switching means with the movement of endless conveying means 40 so that the retracted guide posts 289 are pulled up around sprocket wheels 260 from underneath the horizontal section 20. When slide assembly 80 has reached the other end of section 20 near fixed pulley wheel 70H, all retracted guide posts 289 are on the top side of section 20 while the half of the deck of slats 290 without guide posts 289 are stored on the underside of section 20.

FIGS. 12 and 13 show two typical, but not limited to, embodiments of a plurality of interconnected conveying sections 3 for carrying items 2 to be accumulated. The illustrated embodiments of the interconnected conveying sections 3 are versions of basic pivot radius tab table top conveyors (manufactured by the Budd Company) and roller chains (available from a multitude of manufacturers).

FIG. 12 shows one of a plurality of items 2, in this case, an irregular shaped container, being transported along part of the path of movement of the table top conveyor which is made up of the plurality of interconnected conveying sections 3. In this first embodiment of the table top conveyor, each conveying section 3 constitutes itself a potential device for directly carrying one or more of the plurality of items 2. Thus, there is no need, as in the prior art, to have a separate assembly for carrying an item 2 alongside each conveying section 3. Each of the plurality of conveying sections 3 has a groove 8 and a bolt 9 for swinging movement through an arc 11 about a tongue 12 of an interconnected conveying section 3.

FIG. 13 shows one of a plurality of items 2, in this case, but not limited to, a wrapped stack of thin cheese slices, being transported along part of the path of movement of the plurality of conveying sections 3, in this case, a roller chain which forms the endless conveying means. In this second embodiment, the device for directly carrying one of the plurality of items 2 is a plate 14 for retaining the wrapped stack thereon. Each plate 14 has upturned ends 15 which help retain the wrapped stack 2 thereon. Thus, ends 15 counteract the centrifugal force which acts tangentially to the path of movement and which tends to throw the stack 2 off plate 14 whenever the endless conveying means goes around a pulley wheel. Each plate 14 also has tapered sides 16 which allow the limited swinging movement required when each plate 14 is going around a pulley wheel.

The operation of the power-driven conveyor system 10 on section 20 will now be described by reference to FIGS. 14-23 which show the endless conveying means 40 generally and not each of the plurality of individual conveying sections 3 that carry items 2. Also, the embodiments shown in FIGS. 14-23 differ from the systems shown in FIGS. 1 and 8 in that the infeed drive mechanism 61 and the discharge drive mechanism 62 directly control fixed pulley wheels 71HA and 71HD, respectively, as shown in phantom lines in FIGS. 4 and 6, by way of belts 61B and 62B, pulley wheels 61C and 62C, driving bevel gears 61F and 62F, and driven bevel gears 61G and 62G. In the embodiment shown in FIG. 1, these wheels 71HA and 71HD are controlled through intermediate drive pulley wheels 61D and 62D, respectively shown in FIGS. 4 and 6, around which endless conveying means 40 is looped underneath section 20. Thus, in the embodiments of FIGS. 14-23, the endless conveying means 40 remains at all times substantially parallel to the horizontal section 20. One advantage of this arrangement is that the slide assembly 80 may extend the conveying means 40 substantially completely between the fixed pulley wheels 70H at one end of section 20 and the fixed pulley wheels 71H at the other end of section 20, thereby increasing the amount of space available for accumulating items 2 on conveying means 40 as the latter travels along its path of movement on section 20.

FIGS. 14-16 show an embodiment of the conveyor system 10 for a small horizontal accumulator with a short amount of storage space and time.

In FIG. 14, conveying means 40 follows a path of movement around left pulley wheel 70H, wheel 70W, and then right pulley wheel 70H. Wheels 70W and 70X are fixed to the slide assembly 80 which is stationary during normal operations when infeed of items 2 equals the discharge thereof.

In FIG. 15, conveying means 40 follows the path of movement around the same wheels, 70H, 70W and 70H, but the path is lengthened because there is only infeed of items 2 and no discharge. Thus, accumulation of items 2 on conveying means 40 is occurring because slide assembly 80 is moving pulley wheels 70W and 70X away from fixed pulley wheels 70H.

In FIG. 16, the path of movement is shortened because there is no infeed and only discharge of items 2, or because the discharge of items 2 is faster than the infeed of items 2. Discharge occurs because slide assembly 80 is moving pulley wheels 70W and 70X toward fixed pulley wheels 70H.

FIGS. 17-20 show an embodiment of the conveyor system 10 for a moderately sized horizontal accumulator having a fair amount of storage space and time. Infeed begins between pulley wheels 71HA and 70H at a position located adjacent to wheel 71HA. Discharge occurs between pulley wheels 71HD and 70H at a position located directly adjacent to wheel 71HD. These wheels 71HA and 71HD are driven independently by infeed drive mechanism 61 and discharge drive mechanism 62, respectively, in a manner somewhat similar to the arrangement shown in FIGS. 3-6.

Basically, during normal operations when infeed equals discharge, both wheels 71HA and 71HD are being driven. During accumulating operations when there is only infeed, wheel 71HA alone is driven. During discharging operations, wheel 71HD is driven alone or at a somewhat faster speed than wheel 71HA is being driven. The infeed onto and the discharge of items 2 from conveying means 40 may be done either manually or automatically by known means.

As shown in FIG. 17, when downstream equipment X, such as, but not limited to a casepacker, malfunctions or is otherwise DOWN, the system 10 allows infeed to continue. Items 2 are accumulated on conveying means 40 which has its path of movement lengthened by having slide assemblies 80 sequentially move away from fixed wheels 70H toward fixed wheels 71H. This accumulation is accomplished by shutting off motor 62A, shown in FIGS. 5 and 6, so that pulley wheel 71HD no longer drives conveying means 40.

Because motor 61A shown in FIGS. 3 and 4 is still running, slack in conveying means 40 results so that pulley wheel 71HA pulls thereon, as indicated by double arrows therearound, in order to lengthen the path of movement by sequentially shifting slide assemblies 80 away from fixed pulley wheels 70H. This accumulation of items 2 in system 10 eliminates source downtime or the need to manually or automatically remove the items 2 from the conveying means 40.

As shown in FIG. 18, as soon as downstream equipment, as indicated with X in FIG. 17, is up and running again, the system 10 returns to its function as a conveyor and discharges the items 2 in the same order in which they were received from the infeeding source IN. Motor 62A, shown in FIGS. 5 and 6, is turned on again. Pulley wheel 71HD may be run faster by the motor 62A than pulley wheel 71HA is run by the motor 61A. As indicated in FIG. 18 by triple arrows around pulley wheel 71HD, there is a pull generated on conveying means 40 in order to shorten the path of movement thereof. This pull results from motor 62A operating faster than motor 61A.

As shown in FIG. 19, eventually the system 10 may be returned to a situation in which the conveying means 40 has its shortest possible path of movement around pulley wheels 70H and 70W, alternately.

On the other hand, motor 62A, shown in FIGS. 5 and 6, may be left idling after the downstream equipment X is up and running again in order to completely fill the system 10 with items 2. In such a situation, which is not illustrated in the drawings, the pulley wheel 71HA is driven by motor 61A so that all slide assemblies 80 are sequentially moved away from fixed pulley wheels 70H at one end of section 20 and are shifted adjacent to fixed wheels 71H at the other end of section 20.

Likewise, motor 62A may be run at the same speed as motor 61A as soon as downstream equipment X is up and running again so that the path of movement of items 2 on conveying means 40 remains as shown in FIG. 18. Thus, there is at least some accumulation of items 2 in the system 10 in the event that the upstream equipment X malfunctions or is otherwise inoperative.

As shown in FIG. 20, infeed is halted by a breakdown in the upstream equipment X but there is at least partial accumulation of items 2 in the system 10. In this situation, motor 61A, shown in FIGS. 3 and 4, is turned off and motor 62A is left switched on. Pulley wheel 71HA stops driving conveying means 40 and is left idling, as indicated by the one arrow therearound in FIG. 20. Motor 62A continues to drive pulley wheel 71HD, as indicated by the double arrows therearound in FIG. 20, so that items 2 continue to be discharged from conveying means 40 to downstream equipment, such as but not limited to the case packer (not shown). The idling of pulley wheel 71HA creates a slack in conveying means 40 so that wheel 71HD pulls thereon in order to shorten the path of movement by causing slide assemblies 80 to sequentially shift away from fixed pulley wheels 71H and toward fixed pulley wheels 70H. This discharge of items 2 from the system 10 will continue until the conveying means 40 achieves once again the shortest possible path of movement, shown in FIG. 19, around wheels 70H and 70W, alternately. Thus, the downstream equipment may continue to operate, without lost production time, until the upstream equipment X is up and running again or until the system 10 is emptied of all items 2 accumulated therein.

Of course, the larger the area occupied by section 20 or the greater the number of planar sections 30, to be discussed hereinafter, added in a vertical tier with section 20, the longer will be the possible path of movement with its resultant increased capacity of accumulation of items 2 in the system 10.

Figure 21:
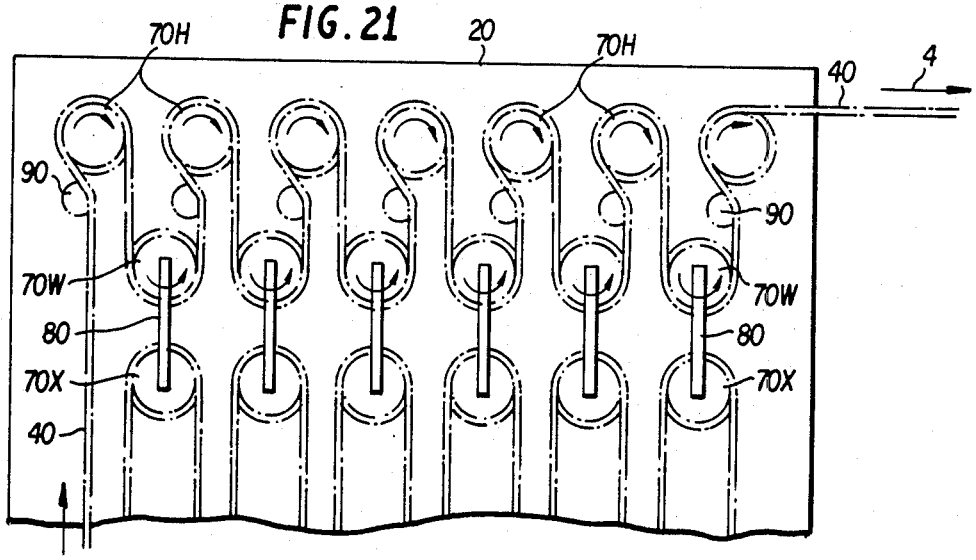
FIG. 21 is a partial top plan view of one end of a modification of the embodiment shown in FIG. 1.

FIG. 21 shows another embodiment of section 20 with the arrangement of fixed pulley wheels 70H and pairs of pulley wheels 70W-70X interconnected by slide assemblies 80. The plurality of pulley wheels 70W, 70X and 70H are aligned for greater density by the imposition by posts 90. These posts 90 are stationary and effectively change the path of movement of the endless conveying means 40 around the pulley wheels 70H, 70W and 70H so that the path is condensed into an area smaller than the area that would be occupied by the same number of pulley wheels in the embodiment of section 20 as it is shown in FIG. 1.

Figure 22:
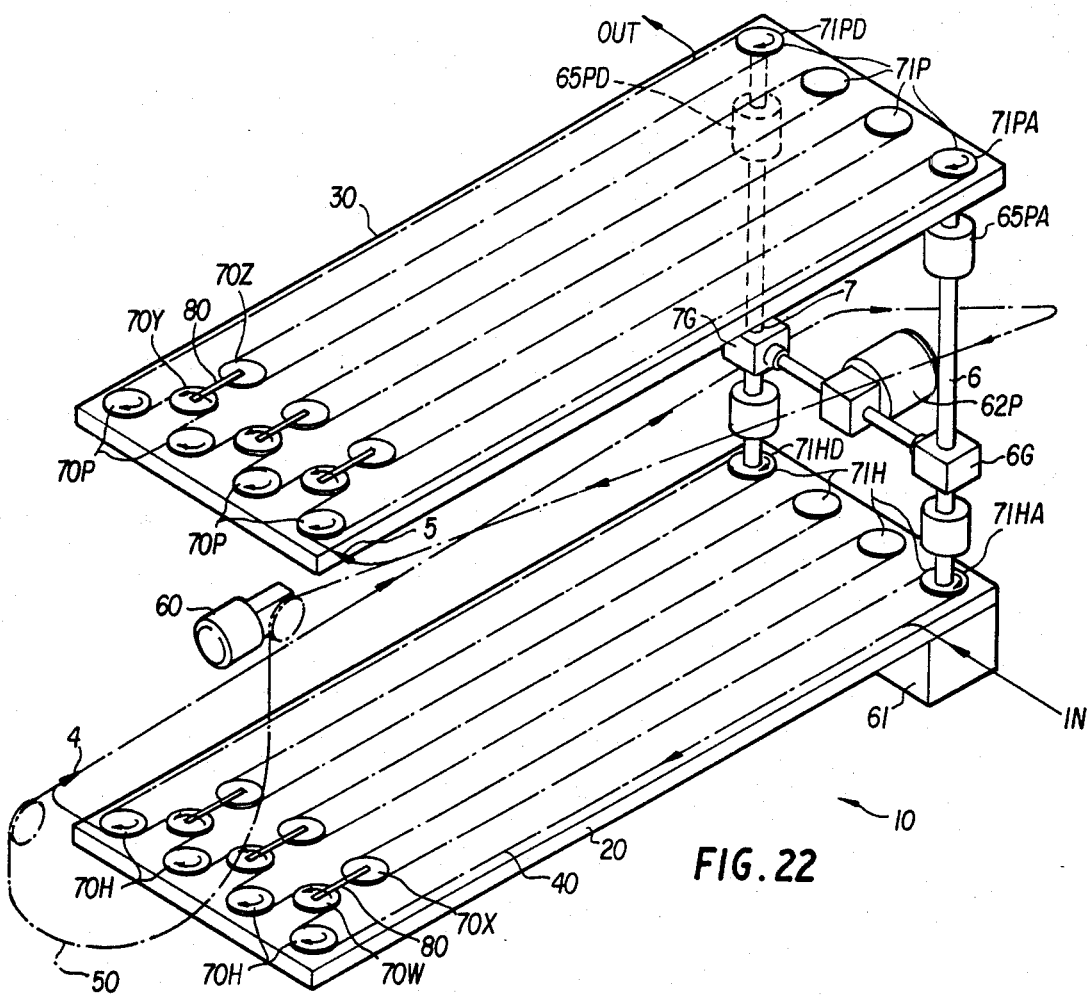
FIG. 22 is a perspective view showing a multi-tiered arrangement of the moderately sized version of the embodiment shown in FIGS. 17-20; this arrangement provides additional accumulation capacity with no increased floor space requirement.

FIG. 22 shows another embodiment of the power-driven conveyor system 10 for transporting and accumulating the plurality of items 2, shown in FIGS. 12 and 13, along the path of movement, indicated by arrow heads, from an infeeding source IN to an outgoing destination OUT. The system 10 has the horizontally oriented accumulator section 20 for accumulating the plurality of items 2 along the path. An additional horizontal accumulator section 30 is arranged above the lower section 20 to increase the overall accumulating capacity of the system without any increase in the required floor space. Additional tiers may be added, if desired.

In the embodiment shown in FIG. 22, the endless conveying means 40 transports the plurality of items 2 along the path of movement in the same manner as shown in FIGS. 14-21. The plurality of conveying sections 3, shown in FIGS. 12 and 13, are interconnected to form the endless conveying means 40. A second endless conveying means 50 assists endless conveying means 40 in its movement from an exit point 4 of the horizontally oriented section 20 at the bottom of the vertical tier to an inlet point 5 of the additional planar section 30. Endless conveying means 50 renders this assistance to endless conveying means 40 by connecting thereunder so that both conveying means 40 and 50 travel in tandem up the spiraling path of movement from point 4 to point 5. Conveying means 50 is driven by a motor 60 while conveying means 40 is driven by infeed drive mechanism 61, shown in detail in FIGS. 3 and 4, and by discharge drive mechanism 62, shown in detail in FIGS. 5 and 6.

Hereinafter, the designation P is used to refer to pulley wheels on the planar section 30. The plurality of fixed pulley wheels 70H is arranged at one end of the horizontally oriented section 20 while a similar plurality of fixed pulley wheels 70P is arranged on the same end of the additional planar section 30. These fixed pulley wheels 70H and 70P guide the endless conveying means 40 along the path of movement indicated by the arrow heads. The plurality of interconnected pairs of pulley wheels 70W and 70X is also arranged on the horizontally oriented section 20 while a similar plurality of pulley wheels 70Y and 70Z is arranged on the additional planar section 30. The pulley wheels 70W-70X and 70Y-70Z are interconnected in pairs by the slide assemblies 80, shown in detail in FIG. 7. The assemblies 80 stretch out or otherwise extend the length of the path of movement of items 2 along sections 20 and 30 in the manner described in detail hereinbefore in regard to FIGS. 14-21. A plurality of driving pulley wheels 71H is arranged at the other end of the horizontally oriented section 20 while a similar plurality of driving pulley wheels 71P is arranged at the same end of the additional planar section 30. The key driving pulley wheels are wheels 71HA and 71PA which control the accumulation of the items 2 on their respective sections 20 and 30. Wheels 71HA and 71PA are interconnected by drive shaft 6 for simultaneous rotation and are controlled by infeed drive mechanism 61. Other key driving pulley wheels are wheels 71HD and 71PD which control the discharge of the items 2 from respective sections 20 and 30. Wheels 71HD and 71PD are interconnected by drive shaft 7 for simultaneous rotation.

Figure 23:
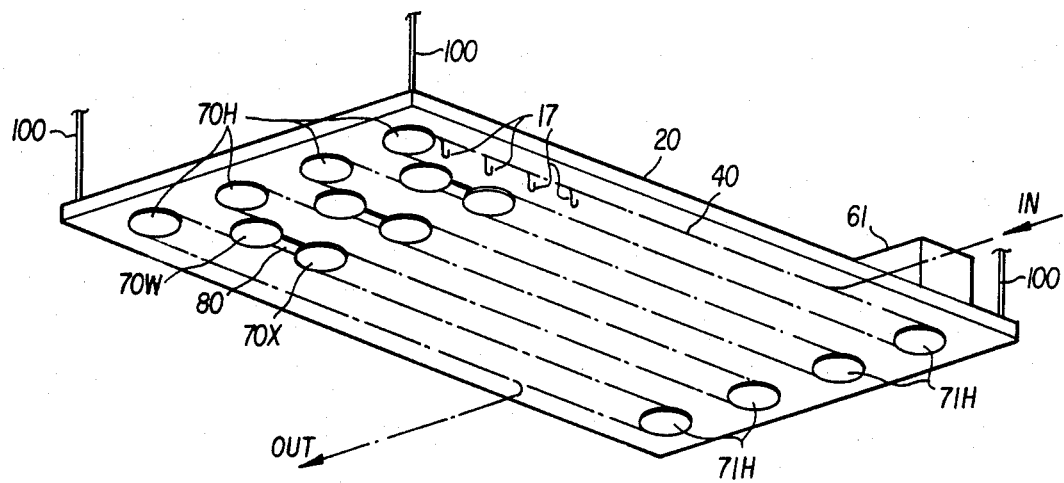
FIG. 23 is a perspective view showing a suspended arrangement of the moderately sized version of the embodiment shown in FIGS. 17-20; this version will accommodate items to be accumulated that are suspended rather than transported as shown in the aforementioned drawings.

FIG. 23 shows the horizontally oriented section 20 arranged with a plurality of hooks 17, each capable of holding an item to be accumulated. The section 20 may be suspended from an overhead support, such as ceiling (not shown) of a building, by legs 100. Necessarily, the infeed and discharge drive mechanisms 61 and 62 are arranged above the driving pulley wheels 71H. Otherwise, the embodiment of section 20 shown in FIG. 23 has the same elements and operates in the same manner as the embodiment of section 20 shown in FIG. 22.

In conclusion, it must be pointed out that the foregoing preferred embodiments are considered as illustrative only. Numerous other modifications and changes will readily occur to those skilled in the art of power-driven conveyors and, consequently, the disclosed invention is not limited to the exact constructions and operations shown and described hereinabove.

I claim:

1. A power drive conveyor system for transporting a plurality of articles, comprising:
    a horizontally oriented section for accumulating the plurality of articles;
    an endless conveying means for transporting the plurality of articles along a horizontal serpentine path of movement on the horizontally oriented section from a source to a destination;
    said conveying means having a substantially continuous article supporting surface for permitting said articles to be infed onto and discharged from said conveying means on a continuous basis while said conveying means is in motion;
    horizontally operated slide assembly means for reversibly extending the length of the serpentine path of movement of the endless conveying means on the horizontally oriented section;
    a first plurality of fixed pulley wheel means, arranged on one end of the horizontally oriented section, for moving the endless conveying means around alternate fixed pulley wheel means and said slide assembly means along the serpentine path of movement on said horizontally oriented section; and
    drive means for sequentially moving said slide assembly means and said endless conveying means associated therewith away from or towards said fixed pulley wheels to change the length of said accumulating section;
    said drive means including an infeed drive mechanism and a discharge drive mechanism working in conjunction therewith, at least one of said infeed drive mechanism and said discharge drive mechanism comprising:
    a first pulley wheel which directs said conveying means in a first direction along said horizontally oriented section;
    a second pulley wheel which directs said conveying means below said horizontal plane in a direction approximately opposite to said first direction;
    a third pulley wheel which directs said conveying means back to said first direction along said horizontally oriented section;
    whereby the occurrence of slack is prevented in said conveying means and the required drive power is transmitted effectively and whereby the transported articles are accumulated on and discharged from the horizontally oriented section on a first-in, first-out basis, accumulated without any significant item back-pressure, and without any loss in orientation as delivered by the source and as required by the destination.

2. The system, according to claim 1, further comprising a plurality of interconnected together conveying section means for forming the endless conveying means, wherein each of the plurality of conveying section means constitutes itself a means for directly carrying the plurality of items.

3. The system according to claim 1, wherein said conveyor article supporting surface comprises interconnecting plate means for transporting the plurality of articles thereon.

4. The system, according to claim 3, wherein said plate means has tapered side means for allowing limited swinging movement of a tongue in a groove of an interconnected one of the plurality of conveying section means.

5. The system, according to claim 1, wherein the slide assembly means includes a plurality of interconnected pairs of pulley wheels.

6. The system, according to claim 1, further comprising a plurality of post means, arranged on the horizontally oriented section, for changing the path of movement on the horizontally oriented section.

7. The system, according to claim 1, further comprising a second plurality of fixed pulley wheel means, arranged on the other end of the horizontally oriented section, for moving the endless conveying means on said horizontally oriented section, and drive means for rotating the second plurality of fixed pulley wheel means.

8. The system, according to claim 5, further comprising frame means for interconnecting the plurality of interconnected pairs of pulley wheels.

9. The system, according to claim 1, further comprising cross brace means for interconnecting each of the slide assembly means whereby a plurality of said slide assembly means move simultaneously to extend the length of the path of movement of the endless conveying means on the horizontally oriented section.

10. The system, according to claim 1, further comprising upstanding guide means for laterally supporting said articles being transported along the path of movement.

11. The system, according to claim 10, wherein the guide means include retractable means in cooperative association with said conveying means.

12. The system, according to claim 1, wherein said infeed drive mechanism and said discharge drive mechanism further comprise a means for guiding said conveying means between said second pulley wheel and said third pulley wheel.

13. The system, according to claim 1, wherein both of said infeed drive mechanism and discharge drive mechanism comprise the first, second, and third pulley wheel arrangement.

14. The system, according to claim 12, wherein said conveying means is deflected laterally by said guiding means between said frst and second pulley wheels.

15. A horizontal power drive conveyor system comprising:
   a conveying means for transporting and accumulating a plurality of upstanding articles from an infeed to a discharge along a substantially horizontal path of movement, said conveying means including at least two conveying sections traveling in opposite directions, said sections each having an article accumulating portion and a non article-carrying portion, both of said portions being reversibly extendable;
   upstanding guide means for providing lateral support for said articles, said guide means being reversibly extendable in cooperation with said article accumulating portion of said conveying section so that the length of said guide means along said article accumulating portion varies in direct relation as the length of said article accumulating portion of said section varies.

16. The horizontal power drive conveyor system of claim 15, wherein said upstanding guide means further comprises a series of inner guide posts disposed between said at least two conveying sections and outer guide posts disposed at the side of said conveying sections opposite said inner guide posts.

17. The horizontal power drive conveyor system of claim 15, further including slat means for forming a movable deck, said slat means being operatively connected to said upstanding guide means.

* * * * *